Dec. 4, 1962 F. STADELMAN 3,066,812
APPARATUS FOR DE-PANNING BREAD LOAVES OR THE LIKE
Filed Aug. 19, 1959 5 Sheets-Sheet 1

INVENTOR.
FRANK STADELMAN
BY
Arthur H. Seidel
ATTORNEY

Dec. 4, 1962 F. STADELMAN 3,066,812
APPARATUS FOR DE-PANNING BREAD LOAVES OR THE LIKE
Filed Aug. 19, 1959 5 Sheets-Sheet 2
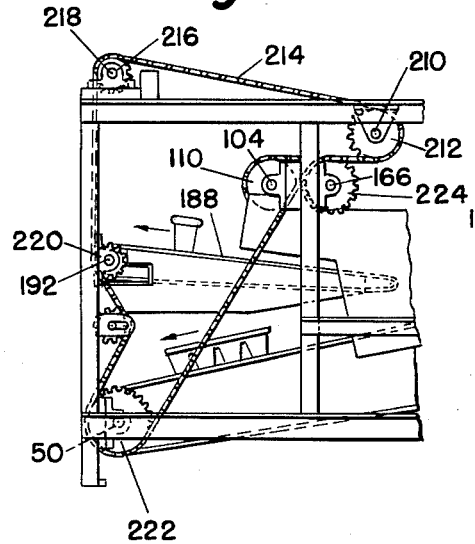
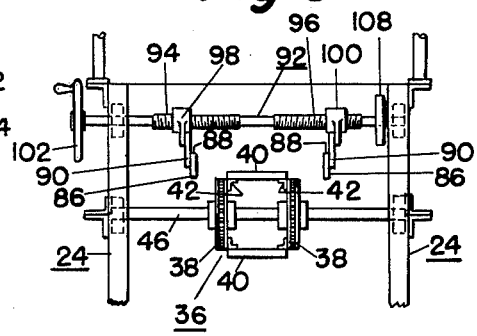
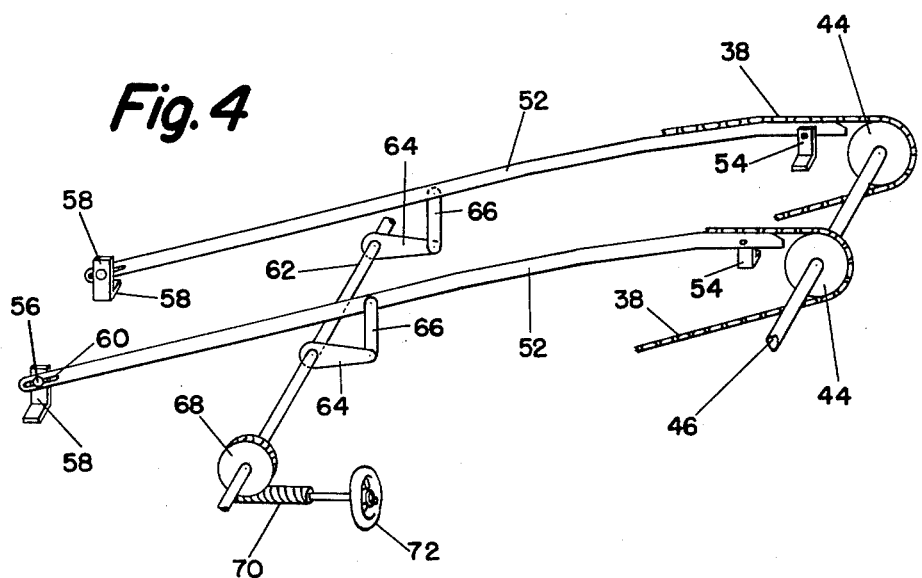
INVENTOR.
FRANK STADELMAN
BY
Arthur H. Seidel
ATTORNEY Dec. 4, 1962   F. STADELMAN   3,066,812
APPARATUS FOR DE-PANNING BREAD LOAVES OR THE LIKE
Filed Aug. 19, 1959   5 Sheets-Sheet 3

INVENTOR.
FRANK STADELMAN
BY
ATTORNEY

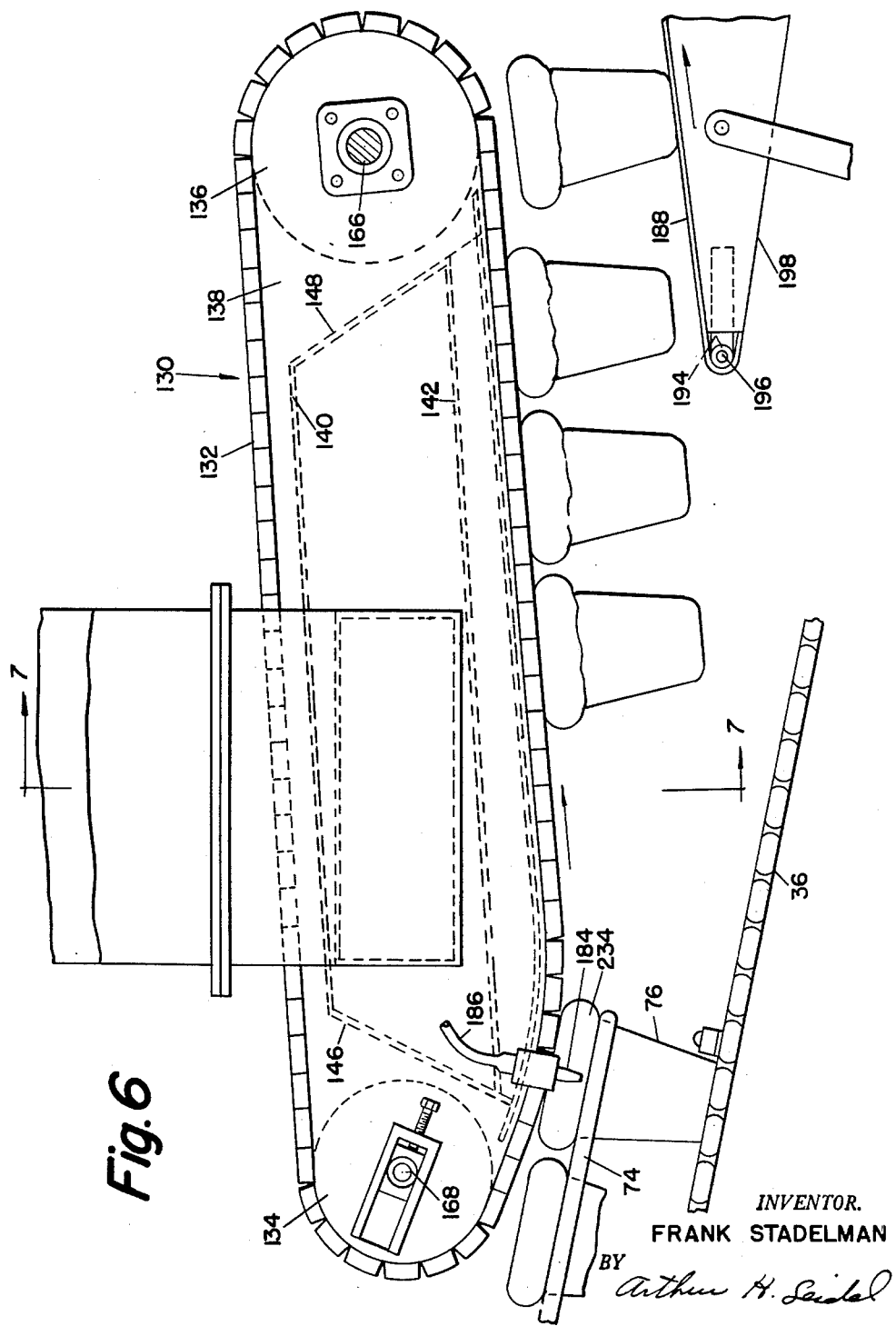

Dec. 4, 1962 F. STADELMAN 3,066,812
APPARATUS FOR DE-PANNING BREAD LOAVES OR THE LIKE
Filed Aug. 19, 1959 5 Sheets-Sheet 5
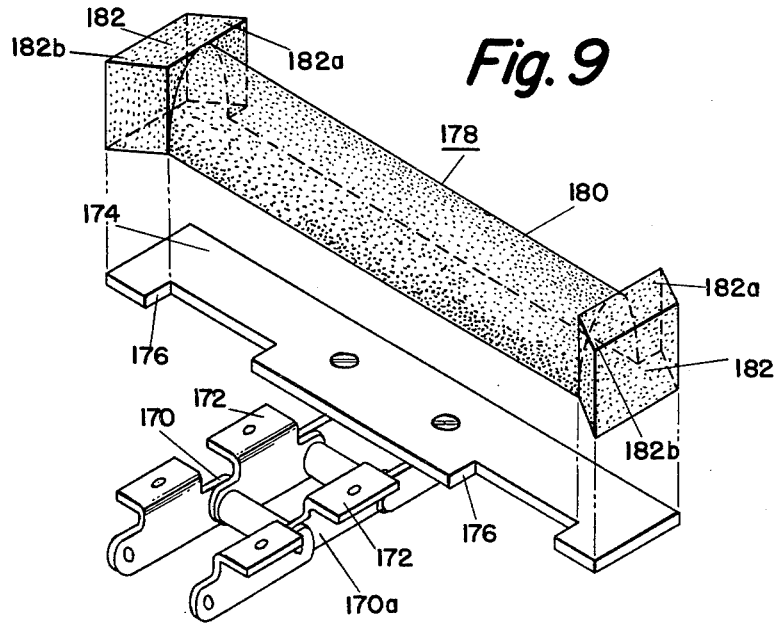
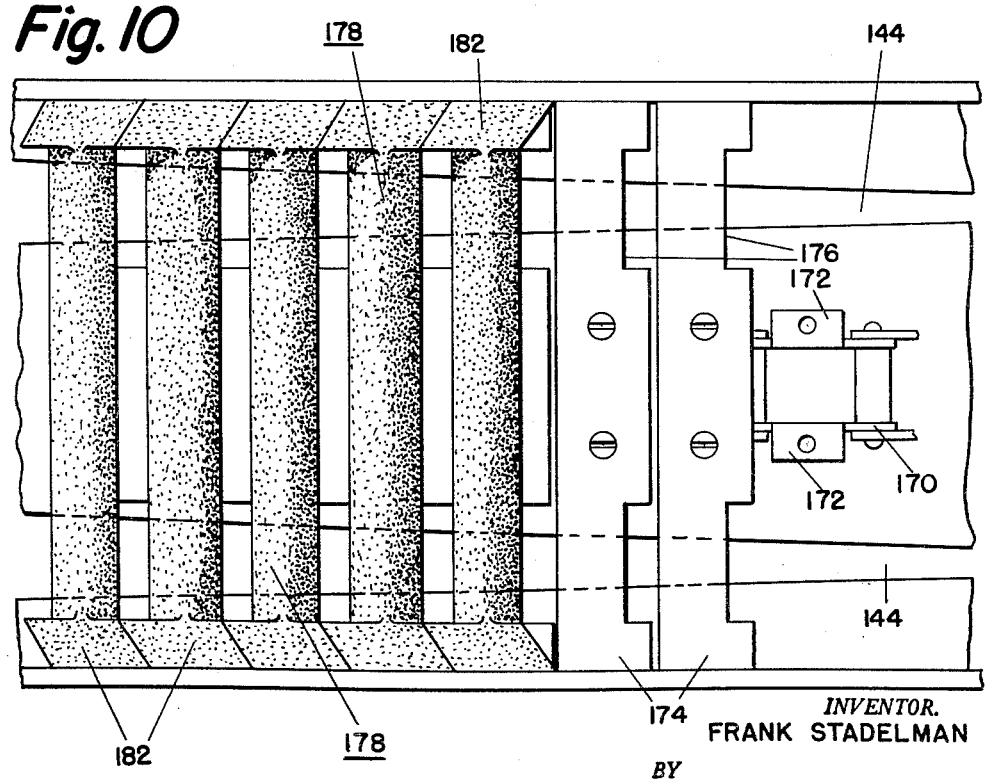
INVENTOR.
FRANK STADELMAN
BY
Arthur H. Seidel
ATTORNEY United States Patent Office 3,066,812
Patented Dec. 4, 1962

3,066,812
APPARATUS FOR DE-PANNING BREAD
LOAVES OR THE LIKE
Frank Stadelman, Cranford, N.J., assignor to Latendorf
Conveying Corporation, Bayonne, N.J., a corporation
of New Jersey
Filed Aug. 19, 1959, Ser. No. 834,726
3 Claims. (Cl. 214—309)

The present invention relates to apparatus and method for de-panning bread loaves or the like.

In bakeries, bread is oridinarily baked in pan straps comprising a plurality of side-by-side pans for individual loaves; the individual pans being connected into a more or less unitary assembly. The pan strap is provided with a lid which covers all of the individual pans, and which is relatively heavy; the extra weight helping to maintain uniform loaf-size during baking.

After baking has been completed, the covered pan strap is removed from the oven, after which its lid must be removed and the individual loaves of bread must be taken out.

Due to the weight of the lid and the frequent tendency of the baked loaves to stick or adhere to the individual pans, manual de-lidding and de-panning (i.e. removal of the baked loaves from the pan strap) is a difficult and time-consuming operation.

Various machines have heretofore been suggested for de-lidding and de-panning bread loaves, but these previously known machines have all been extremely complicated and costly. In addition, these machines generally de-pan the bread loaves from the pan straps by dropping the de-lidded pan straps up-side down on a rack to help the bread loaves from the pan strap. Such dumping operation not only damages the pan straps, but also causes an excessively high portion of the baked loaves to be bruised or broken.

It is an object of the present invention to provide a novel apparatus and method for automatically de-lidding and de-panning bread loaves.

It is another object of the present invention to provide an apparatus and method for de-lidding an de-panning bread loves in which the loaves of bread are lifted from the pans of the pan strap.

Other objects will appear hereinafter.

For the purpose of illustrating the invention there is shown in the drawings a form which is presently preferred; it being understood, however, that this invention is not limited to the precise arrangements and instrumentalities shown.

FIGURE 2 is a side elevational view of a portion of the de-lidding and de-panning machine of the present invention showing the conveyor drive means of the machine.

FIGURE 3 is an elevational view of the entrance end of the de-lidding and de-panning machine of the present invention.

FIGURE 4 is a diagrammatic view showing the height adjusting means for the pan conveyor of the machine of the present invention.

FIGURE 6 is side elevational view of the conveyor of the machine of the present invention for lifting the bread loaves from the pans.

FIGURE 9 is an exploded perspective view of one link of the bread loaf lifting conveyor.

FIGURE 10 is a bottom elevational view, partly broken away, of the bread loaf lifting conveyor.

Figure 1:
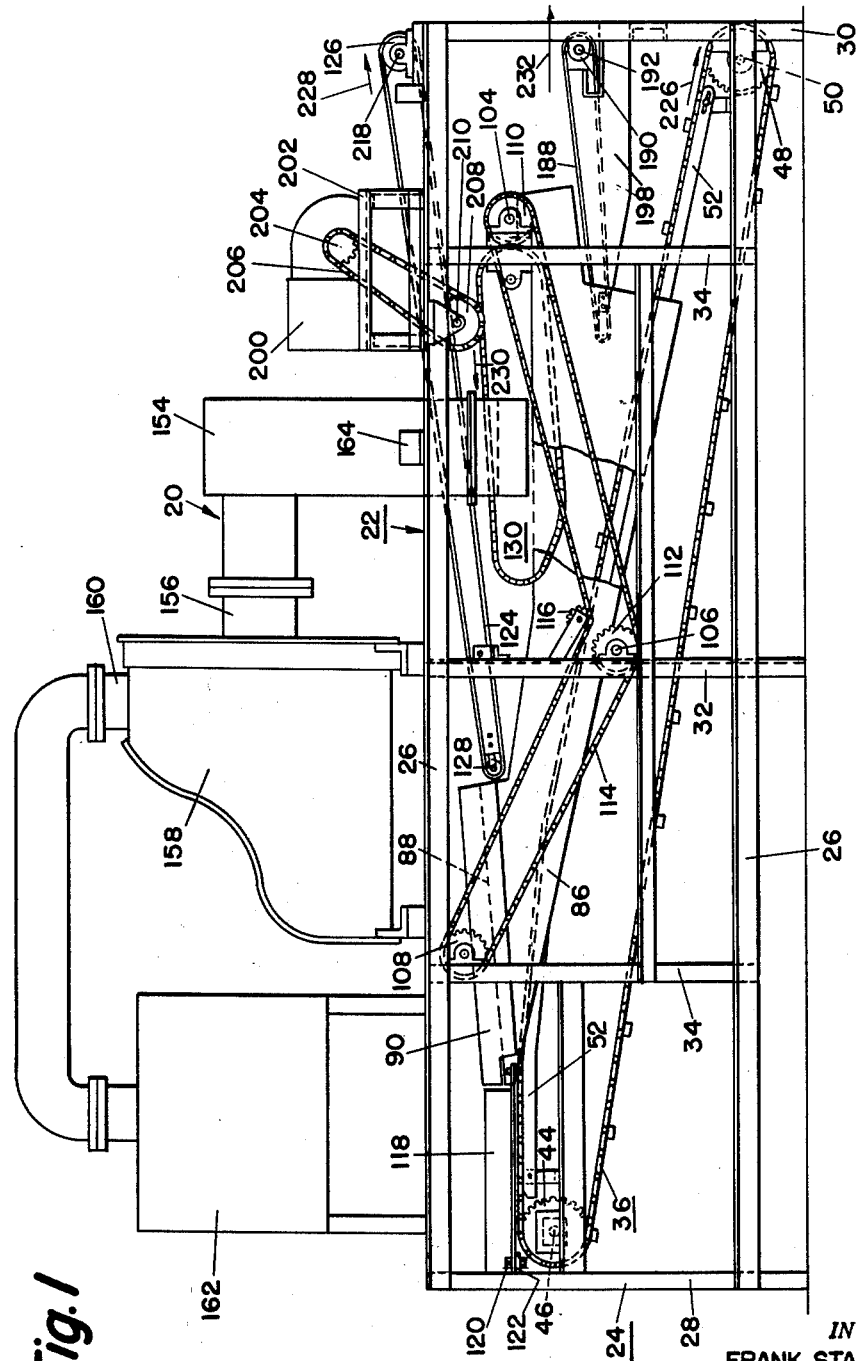
FIGURE 1 is a side elevational view of the automatic de-lidding and de-panning machine of the present invention.

Referring initially to FIGURE 1, the de-lidding and de-panning machine of the present invention is generally designated as 20.

Machine 20 includes a generally rectangular housing 22. Housing 22 comprises two upright frames 24 connected together in spaced, parallel relation. Each of the frames 24 comprises horizontally extending beams 26 connected in spaced, parallel relation by vertical end posts 28 and 30, a vertical intermediate post 32, and vertical intermediate braces 34.

A conveyor, generally designated as 36 extends the entire length of the housing 22 between the side frames 24. As shown in FIGURE 3, conveyor 36 comprises a pair of spaced, parallel endless chains 38 connected together at spaced points along the lengths of the chains 38 by bars 40. The ends of the bars 40 are secured to angled brackets 42 which are mounted on the links of the chains 38. At the entrance end of the machine 20 the chains 38 extend around sprocket wheels 44. Sprocket wheels 44 are mounted in spaced relation on a shaft 46 which is rotatably mounted between the side frames 24 of the housing 22. At the exit end of the machine 20 the endless chains 38 extend around sprocket wheels 48. Sprocket wheels 48 are mounted in spaced relation on a shaft 50 which is rotatably mounted between the side frames 24 of the housing 22.

The top run of the conveyor 36 extends substantially horizontally for a short distance away from the entrance end of the machine 20, and then extends downwardly to the exit end of the machine 20. As shown in FIGURE 4, the top run of each of the chains 38 of the conveyor 36 is supported on a separate elongated guide rail 52. The guide rails 52 extend from the sprocket wheels 44 to the sprocket wheels 48, and are shaped to provide the horizontal and then downward path of the top run of the conveyor 36. The ends of the rails 52 adjacent the sprocket wheels 44 are each pivotably mounted on a separate bracket 54 which brackets 54 are secured to the side frames 24 of the housing 22. The ends of the rails 52 adjacent the sprocket wheels 48 are each slidably mounted on a separate pin 56 extending from brackets 58. The pins 56 extend through elongated slots 60 in the ends of the rails 52, and the brackets 58 are mounted on the side frames 24 of the housing 22. A shaft 62 extends beneath the rails 52, and is rotatably supported between the side frames 24 of the housing 22. A separate arm 64 is secured to the shaft 62 beneath each of the rails 52. Arms 64 extend radially from the shaft 62, and are substantially parallel to the rails 52. A separate link 66 is pivotally connected between each of the arms 64 and its respective rail 52. A gear 68 is secured to the shaft 62 adjacent one of the side frames 24 of the housing 22. A worm gear 70 meshes with the gear 68, and is rotatably supported on the side frame 24 of the housing 22. A handle 72 is secured to the worm gear 70 to rotate the worm gear 70. Rotation of the handle 72 rotates the shaft 62 and the arms 64. Rotation of the arms 64 moves the links 66 up or down so as to move the guide rails 52 up or down. As the intermediate portion of the guide rail 52 is moved up or down by the links 66, the front ends of the guide rails 52 will pivot with respect to the brackets 54, and the rear end of the guide rails 52 will slide with respect to the brackets 58. Thus, by rotating the handle 72, the guide rails 52 are moved up or down to vary the height of the top run of the chains 38 of the conveyor 36.

The conveyor 36 serves to carry filled and lidded pans or pan straps 74 through the machine 20 to permit the pan straps 74 to be de-lidded, and the loaves of bread removed from the pan strap 74.

Figure 5:
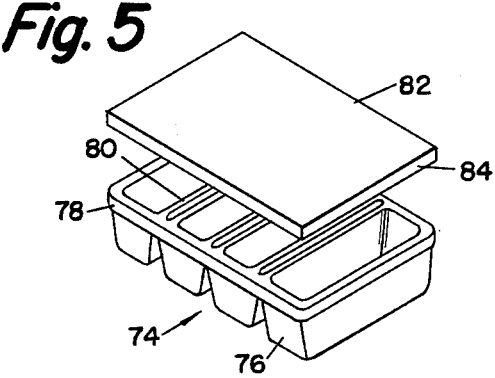
FIGURE 5 is a perspective view of a pan strap and its lid, the lid being shown in removed position.

As shown in FIGURE 5, each pan strap 74 includes a plurality (for example 4) of individual pan elements 76. Each of the pan elements 76 is intended to hold a single loaf of bread or the like. The pans 76 are rigidly held in spaced side-by-side relation by a rectangular frame 78 and a plurality of transversely disposed spacer elements 80 which connect the adjoining parallel edges of adjacent pans 76. The pan strap 74 is provided with a lid 82. Lid 82 has a peripheral flange 84 of substantial thickness which fits over and protrudes beyond the pan strap 74.

Referring again to FIGURE 1, a pair of parallel guide plates 86 extend along opposite sides of the top run of the conveyor 36. At the front ends of the guide plates 86 the top edges 88 of the guide plates 86 extend upwardly away from the conveyor 36. A separate support plate 90 extends along and is secured to the outer surface of each of the guide plates 86. Support plates 90 extend along the upwardly extending top edge 88 of the guide plates 86, and the support plates 90 extend above the top edges 88 of the guide plates 86 (see FIGURE 3).

Adjacent the front ends of the guide plates 86, a shaft 92 extends across the guide plates 86, and is rotatably supported on the side frames 24 of the housing 22. Shaft 92 has two separate threaded portions 94 and 96. One of the threaded portions of the shaft 92 is a left hand thread, and the other threaded portion is a right hand thread. Internally threaded collars 98 and 100 are threadably mounted on the threaded portions 94 and 96 respectively. The collars 98 and 100 are each secured to a separate one of the support plates 90. Thus, the guide plates 86 are supported from the shaft 92. Shaft 92 has a handle 102 at one end. By rotating the handle 102 the shaft 92 is rotated to move the guide plates 86 toward or away from each other.

A shaft 104 extends across the guide plates 86 adjacent the rear end of the guide plates 86, and a shaft 106 extends across the guide plates 86 intermediate the ends of the guide plates 86. The shafts 104 and 106 are rotatably supported by the side frames 24 of the housing 22. Like the shaft 92, each of the shafts 104 and 106 has two separate threaded portions, one portion being a left hand thread and the other portion being a right hand thread. Each of the shafts 104 and 106 has a pair of collars threadably mounted on the threaded portions thereof, which collars are secured to the guide plates 86. A sprocket wheel 108 is mounted on the shaft 92, a sprocket wheel 110 is mounted on the shaft 104, and a sprocket wheel 112 is mounted on the shaft 106. An endless chain 114 extends around the sprocket wheels 108, 110 and 112. An idler sprocket wheel 116 rotatably mounted on the side frame 24 engages the endless chain 114 to take up any slack in the endless chain 114. Thus, when shaft 92 is rotated by the handle 102, the endless chain 114 simultaneously rotates the shafts 104 and 106. Thus, the entire lengths of the guide plates 86 are moved toward or away from each other to permit various sizes of pan straps 74 to pass between the guide plates 86.

A pair of entrance guide plates 118 extend along opposite sides of the top run of the conveyor 36 between the front end of the guide plates 86 and the entrance end of the machine 20. The front end of each of the entrance guide plates 118 is pivotally secured by a pivot pin 120 to a bracket 122 extending from the front post 28 of a side frame 24. The back end of each of the entrance guide plates 118 is hingedly secured to the front end of a guide plate 86. Thus, when the guide plates 86 are moved toward or away from each other, the entrance guide plates 118 will pivot about the pivot pins 120 to vary the angle between the entrance guide plates 118.

The upwardly extending upper edges 88 of the guide plates 86 serve to remove the lid 82 from the pan strap 78 in a manner as will be explained. A lid conveyor belt 124 extends upwardly from the back end of the top edges 88 of the guide plates 86 to the exit end of the housing 22. At the exit end of the housing 22 the conveyor belt 124 extends around a pulley 126 which is rotatably mounted on the top of the housing 22. At the back end of the top edges 88 of the guide plates 86, the conveyor belt 124 extends around a pulley 128 which is rotatably mounted between the side frames 24 of the housing 22.

A bread loaf de-panning mechanism, generally designated 130, is mounted within the housing 22 above and along a portion of the downwardly extending portion of the top run of the conveyor 36.

The de-panning mechanism 130 comprises an endless conveyor 132 extending between a pair of spaced sprocket wheels 134 and 136 (see FIGURE 6). The de-panning conveyor 132 extends over and along the pan strap conveyor 36 with the bottom run of the de-panning conveyor 132 extending substantially horizontal. Thus, the top run of the pan strap conveyor 36, which extends downwardly, extends away from the bottom run of the de-panning conveyor 132.

Figure 7:
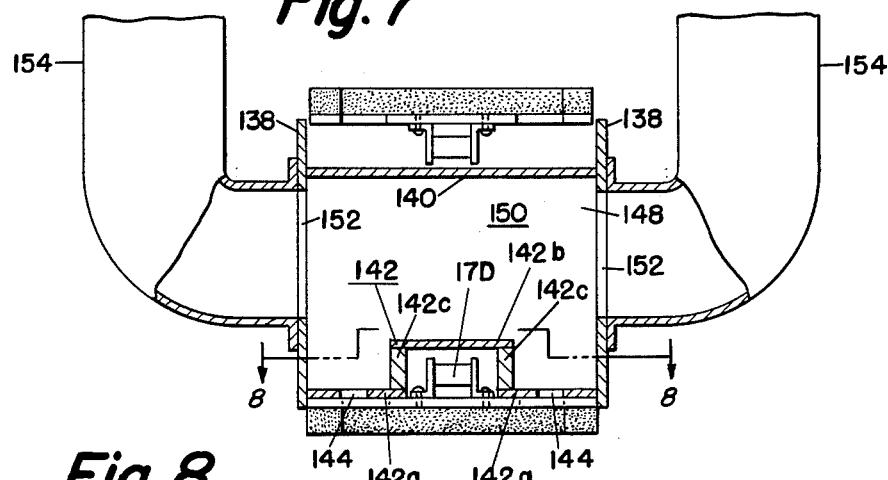
FIGURE 7 is sectional view taken along line 7—7 of FIGURE 6.
Figure 8:
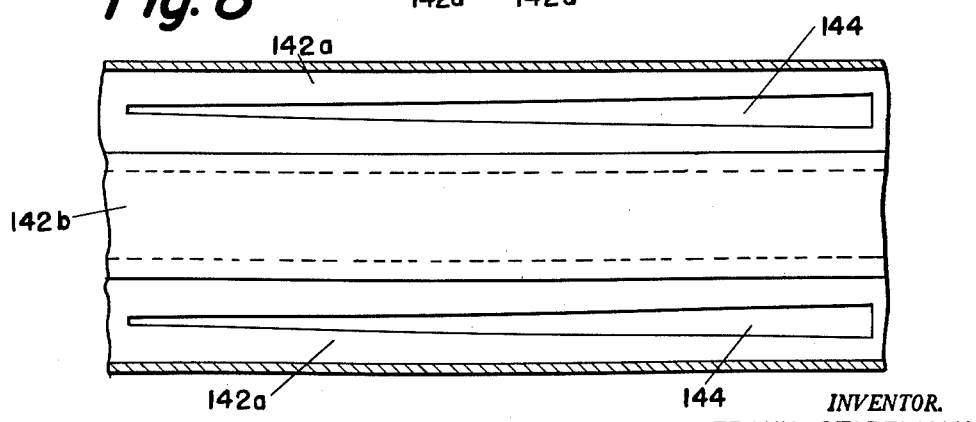
FIGURE 8 is an elevational view looking in the direction of arrows 8—8 in FIGURE 7.

As shown in FIGURES 6 and 7, a pair of side walls 138 extend along opposite sides of the de-panning conveyor 132 for the entire length of the conveyor 132. A top wall 140 is secured between the side walls 138, and extends beneath the top run of the conveyor 132 between the sprocket wheels 134 and 136. A bottom wall 142 is connected between the side walls 138, and extends along the bottom run of the conveyor 132 between the sprocket wheel 134 and the sprocket wheel 136. Bottom wall 142 has a pair of spaced, aligned side portions 142a, and an intermediate portion 142b. The intermediate portion 142b is above the side portions 142a, and is connected to the inner edges of the side portions 142a by upright connectors 142c. The upright connectors 142c and the intermediate portion 142b form an outwardly facing trough through which the chain of the conveyor 132 passes. Each of the side portions 142a of the bottom wall 142 has a longitudinally extending opening 144 therethrough. As shown in FIGURE 8, the width of each of the openings 144 decreases from the end of the bottom wall 142 adjacent the sprocket 134 to the end of the bottom wall 142 adjacent the sprocket wheel 136. End walls 146 and 148 are connected between the top wall 140, the bottom wall 142, and the side walls 138 adjacent the sprocket wheels 134 and 136 respectively.

Thus, the side walls 138, the top wall 140, the bottom wall 142 and the end walls 146 and 148 form an enclosure 150 within the conveyor 132. Each of the side walls 138 has an opening 152 therethrough into the enclosure 150. A pair of ducts 154 are secured to the outer surfaces of the side walls 138 so as to be in communication with the enclosure 150 through the openings 152. The ducts 154 extend upwardly from the de-panning mechanism 130, and are connected to the inlet 156 of an exhaust device 158 such as a turbo-compressor. The turbo-compressor 158 is mounted on the top of the housing 22. The outlet 160 of the turbo-compressor 158 is connected to an air filter 162 mounted on the top of the housing 22.

As shown in FIGURE 1, each of the ducts 154 is secured to a side frame 24 of the housing 22 by a bracket 164. Thus, one end of the de-panning mechanism 130 is supported from the housing 22 by the ducts 154. The sprocket wheel 136 is mounted on a shaft 166 which is rotatably supported between the side frames 24 of the housing 22. The side walls 138 are supported on the shaft 166. Thus, the other end of the de-panning mechanism 130 is supported on the housing 22 by the shaft 166. The sprocket wheel 134 is mounted on a shaft 168 which is rotatably supported between the side walls 138.

The de-panning conveyor 132 comprises an endless chain 170. As shown in FIGURE 9, each link 170a of the chain 170 has a pair of flat, diverging mounting flanges 172. A substantially rectangular metal plate 174 extends across each of the links 170a of the chain 170, and is secured to the mounting flanges 172. The plate 174 has a pair of spaced notches 176 in an edge of the plate 174 and on opposite sides of the chain 170. The plates 174 are of a width substantially equal to the width of the top wall 140 and bottom wall 142 of the enclosure 150 (see FIGURE 7). The notches 176 are positioned so that when the plates 174 pass along the bottom wall 142, the notches 176 are in alignment with the openings 144 in the side portions 142a of the bottom wall 142.

A pad 178 of a relatively soft, resilient material, such as soft rubber or a foam plastic, is secured to the outer surface of each of the plates 174. Each of the pads 178 comprises an elongated central section 180 which is semi-elliptical in transverse cross-section, and a pair of parallelepiped end sections 182. The central section 180 is positioned adjacent one side of the inner faces of the end sections 182 so that a corner 182a of the end sections 182 projects beyond the central section 180. The corner 182b of each of the end sections 182 which is diametrically opposite the corner 182a also projects beyond the side of the central section 180. The pad 178 is securely mounted on the plate 174 with the flat bottom surface of the central section 180 being positioned between the unnotched edge of the plate 174, and the inner ends of the notches 176. The corners 182b of the end sections 182 are seated in the corners of the plate 174 adjacent the notches 176, and the corners 182a of the end sections 182 project beyond the unnotched side of the plate 174.

In the assembled conveyor 132, as shown in FIGURE 10, the plates 174 are in side-by-side relation with the notches 176 providing openings between the plates 176 on opposite sides of the chain 170. The central portions 180 of the pads 178 are in spaced, parallel relation with the spaces between the central portions 180 being in communication with the notches 176 in the plates 174. The corners 182a of the end portions 182 of the pads 178 which project beyond the sides of the plates 174 overlap a portion of the adjacent plate 174. Thus, the side surfaces of the end portions 182 of adjacent pads 178 are in contact so as to seal the ends of the spaces between the central portions 180 of the pads 178. During the movement of the conveyor 132, as the conveyor passes under the bottom wall 142 of the enclosure 150, the chain 170 passes through the trough between the upright connectors 142c, and the plates 174 slide along the bottom surface of the side portions 142a of the bottom wall 142. Thus, the openings between the central portions 180 of the pads 178 are in communication with the enclosure 150 through the notches 176 in the plates 174, and the openings 144 in the side portions 142a of the bottom wall 142.

As shown in FIGURE 6, a small nozzle 184 is mounted on the outer surface of each of the side plates 138 of the de-panning mechanism. The nozzles 184 are mounted along the bottom edge of the side plates 138, and adjacent the sprocket wheel 134. A pipe 186 connects each of the nozzles 184 to a source of compressed air. The nozzles 184 are arranged to direct streams of air into the ends of the pans 76 of a pan strap 74 in a manner which will be described later.

As shown in FIGURES 1 and 6, a substantially horizontally extending conveyor belt 188 extends from the exit end of the housing 22 beneath the back end of the de-panning conveyor 132. The back end of the conveyor 188 extends around a pulley 190. Pulley 190 is mounted on a shaft 192 which is rotatably supported between the side frames 24 of the housing 22. The front end of the conveyor 188 extends around a pulley 194 which is mounted on a shaft 196, rotatably supported between a pair of supporting plates 198 which are mounted on the housing 22. The conveyor 188 serves to carry the loaves of bread from the de-panning conveyor 132 to the exit end of the machine 20.

The pan strap conveyor 36, the lid conveyor 124, the de-panning conveyor 132, and the bread conveyor 188 are all driven from an electric motor 200 which is mounted on a platform 202 on the top of the housing 22. A sprocket wheel 204 mounted on the output shaft of the motor 200 is drivingly connected by an endless chain 206 to a sprocket wheel 208. Sprocket wheel 208 is mounted on a drive shaft 210 which is rotatably supported between the top horizontal beams 26 of the side frames 24 of housing 22. As shown in FIGURE 2, a sprocket wheel 212 is mounted on the drive shaft 210 to rotate simultaneously with the sprocket wheel 208. An endless drive chain 214 extends around the sprocket wheel 212 and drivingly connects the sprocket wheel 212 to a sprocket wheel 216 mounted on the shaft 218 which supports the pulley 126 of the lid conveyor 124. The drive chain 214 also drivingly connects the sprocket wheel 212 to a sprocket wheel 220 mounted on the shaft 192 which supports the pulley 190 of the bread conveyor 188, to a sprocket wheel 222 mounted on the shaft 50 which supports the sprocket wheels 48 of the pan strap conveyor 36, and a sprocket wheel 224 which is mounted on the shaft 166 which supports the sprocket wheel 136 of the de-panning conveyor 132. Thus, the endless chain 214 simultaneously rotates the sprocket wheels 216, 220, 222, and 224 to drive the pan strap conveyor 36, the lid conveyor 124, the de-panning conveyor 132, and the bread conveyor 188. The pan strap conveyor 36 is driven in the direction of arrow 226 in FIGURE 1, the lid conveyor 124 is driven in the direction of arrow 228, the de-panning conveyor 132 is driven in the direction of arrow 230, and the bread conveyor 188 is driven in the direction of arrow 232.

The de-lidding and de-panning machine 20 of the present invention operates as follows:

With the motor 200 running, and the turbo-compressor 158 operating, a filled and lidded pan strap 74 is placed on the front end of the pan strap conveyor 36 between two of the connecting bars 40. The pan strap conveyor 36 carries the pan strap 74 between the entrance guide plates 118 which guide the pan strap 74 between the guide plates 86.

The top edges 88 of the guide plates 86 are positioned so that as the filled and lidded pan strap 74 is carried between the guide plates 86 by the pan strap conveyor 36, the top edges 88 of the guide plates 86 extend beneath the peripheral flange 84 of the lid 82. Since the top edges 88 of the guide plates 86 extend upwardly away from the pan strap conveyor 36, as the pan strap 74 is carried along between the guide plates 86, the peripheral flange 84 of the lid 82 will become seated on and will slide along the top edges 88. When the pan strap 74 reaches the downwardly extending portion of the pan strap conveyor 36, gravity will tilt the pan strap 74 so that the pan strap 74 follows the downward movement of the conveyor 36. Thus, the pan strap 74 is carried downwardly away from the lid 82 which is moving upwardly along the top edges 88 of the guide plates 86. As the pan strap 74 moves downwardly away from the lid 82, the pan strap 74 slides out of the lid 82, and the de-lidded pan strap 74 is carried along by the conveyor 36.

The lid 82 after being removed from the pan strap 74 is pushed along the top edges 88 of the guide plates 86 by the lid of the next pan strap being carried by the conveyor 36. The lid 82 is pushed along the top edges 88 of the guide plates 86 until the lid 82 falls on the lid conveyor 124. The lid conveyor 124 carries the lid 82 to the exit end of the machine 20 where the lid 82 is removed from the machine 20.

The de-lidded pan strap 74 is carried downwardly by the conveyor 36 to the de-panning mechanism 130. During the downward movement of the pan strap 74 the connecting bar 40 of the conveyor 36 which extends across the front of the pan strap 74 prevents the pan strap 74 from sliding under its own weight along the conveyor 36. Thus, the pan strap 74 is moved at a uniform speed by the conveyor 36.

When the first pan 76 of the pan strap 74 passes under the de-panning conveyor 132, the pads 178 of the de-panning conveyor 132 contact the top of the bread loaf 234 in the pan 76 as shown in FIGURE 6. The turbo-compressor 158 draws the air from the enclosure 150 of the de-panning mechanism 130 through the ducts 154 to create a vacuum in the enclosure 150. Since the spaces between the pads 178 of the conveyor 132 are in communication with the enclosure 150 through the notches 176 in the plates 174 and the openings 144 in the bottom wall 142, the vacuum in the enclosure 150 draws air through the spaces between the pads 178. Thus, when the pads 178 engage the top surface of the bread loaf 234, a suction is created in the spaces between the pads 178 which are engaging the bread loaf 234, which suction draws the bread loaf 234 to the pads 178 of the de-panning conveyor 132. To insure proper contact between the pads 178 and the bread loaf 234 to draw the bread loaf 234 to the pads 178, the spacing between the pan strap conveyor 36 and the de-panning conveyor 132 can be adjusted by raising or lowering the guide rails 52 which support the chains 38 of the conveyor 36.

The air nozzles 184 are positioned so that when the pads 178 of the de-panning conveyor 132 contact the bread loaf 234 to draw the bread loaf to the conveyor 132, the nozzles 184 direct a stream of air between the ends of the bread loaf 234 and the ends of the pan 76. The streams of air from the nozzles 184 passing between the ends of the bread loaf 234 and the ends of the pan 76 break any sticking between the bread loaf 234 and the pan 76, and facilitate the lifting of the bread loaf 234 from the pan 76.

As the pan strap conveyor 36 carries the pan strap 74 downwardly under the de-panning conveyor 132, the bread loaf 234 is held to the de-panning conveyor 132 and is carried along by the de-panning conveyor 132. Since the pan strap conveyor 36 moves downwardly away from the de-panning conveyor 132, the bread loaf 234 is slowly lifted out of the pan 76 until the bread loaf 234 is completely free from the pan 76.

The de-panning conveyor 132 carries the bread loaf 234 to a point over the bread conveyor 188. Since the width of the openings 144 in the side portions 142a of the bottom wall 142 decreases from the end of the bottom wall 142 adjacent the sprocket wheel 134 to the end of the bottom wall 142 adjacent the sprocket wheel 136, the suction holding the bread loaf 234 to the de-panning conveyor 132 decreases as the bread loaf 234 is carried along toward the bread conveyor 188. When the bread loaf 234 reaches a point over the bread conveyor 188, the suction holding the bread loaf to the de-panning conveyor 132 has decreased sufficiently to permit the bread loaf 234 to drop onto the bread conveyor 188. The bread conveyor 188 carries the bread loaf 234 to the exit end of the machine 20 where the bread loaf 234 is removed from the machine 20. The empty pan strap 74 is carried by the pan strap conveyor 36 to the exit end of the machine 20 where the pan strap 74 is removed from the machine 20.

Although the operation of the machine 20 of the present invention has been described for both de-lidding and de-panning a pan strap filled with loaves of bread, the machine 20 can also be used merely to de-pan a filled pan strap. Thus, pan straps containing loaves of bread or the like, which were baked without lids can be passed through the machine 20 of the present invention to remove the loaves from the pan strap.

The present invention may be embodied in other specific forms without departing from the spirit or essential attributes thereof and, accordingly, reference should be made to the appended claims, rather than to the foregoing specification as indicating the scope of the invention.

I claim:

1. A machine for de-panning a pan strap containing a plurality of loaves of bread disposed in side-by-side relation comprising a forwardly extending pan strap conveyor, a de-panning conveyor extending along said pan strap conveyor at an angle with respect to said pan strap conveyor, said de-panning conveyor including a pair of spaced sprocket wheels rotatably mounted above said pan strap conveyor, a flexible belt disposed around said wheels, said belt being arranged to contact the top surface of the loaves of bread as the pan strap is carried beneath the de-panning conveyor, means associated with said de-panning conveyor for providing a suction to draw the loaves of bread from said pan strap and hold said loaves of bread to said belt as said belt moves between said wheels, said belt comprising an endless chain, a separate plate extending across and secured to each link of said chain, each of said plates having an opening therethrough on each side of said chain, a plastic pad secured to each of said plates, the central portion of adjacent pads being spaced from each other to provide an opening between adjacent pads which is in communication with the openings in said plates, and said means for providing a suction including a separate elongated opening along each side of said chain in communication with the openings in the plates.

2. In a machine for de-panning loaves of bread from pans, a forwardly extending pan conveyor, a de-panning conveyor extending along said pan conveyor and at an angle to said pan conveyor so that said pan conveyor extends away from said de-panning conveyor, said de-panning conveyor being arranged to contact the top surfaces of the loaves of bread as the pan is carried on said pan conveyor beneath the de-panning conveyor, means associated with said de-panning conveyor for providing a suction to lift the loaves of bread from the pan and hold the loaves of bread to said de-panning conveyor, a separate nozzle on each side of the de-panning conveyor at the point where the de-panning conveyor contacts the loaves of bread, means for supplying air under pressure to said nozzles, said nozzles being arranged to direct streams of air between the ends of the loaves of bread and the inner surfaces of the pans at the same time that the loaves of bread are drawn to the de-panning conveyor to facilitate lifting the loaves of bread from the pan, the de-panning conveyor having a plurality of openings therethrough, the means associated with the de-panning conveyor for providing the suction comprising an enclosure within and extending along the de-panning conveyor, said enclosure having an elongated opening therethrough in communication with the openings in the de-panning conveyor, means connected to said enclosure for exhausting said enclosure, said de-panning conveyor comprising an endless chain, a separate plate extending across and secured to each link of said chain, each of said plates having an opening therethrough on each side of said chain, a plastic pad secured to each of said plates, the central portions of adjacent pads being spaced from each other to provide an opening between adjacent pads which is in communication with the openings in said plates, and the enclosure having a separate elongated opening along each side of said chain in comunication with the openings in the plates.

3. A machine in accordance with claim 2 in which the elongated openings in the enclosure are wider at one end of the de-panning conveyor than at the other end of the de-panning conveyor.

References Cited in the file of this patent

UNITED STATES PATENTS 1,077,399   Droitcour   Nov. 4, 1913

(Other references on following page)

UNITED STATES PATENTS

| | | |
|---|---|---|
| 1,377,136 | Lawrence et al. | May 3, 1921 |
| 1,913,877 | Frederick | June 13, 1933 |
| 1,945,886 | Den Boer | Feb. 6, 1934 |
| 2,271,937 | Engels | Feb. 3, 1942 |
| 2,445,884 | MacManus | July 27, 1948 |
| 2,485,040 | Cupo | Oct. 18, 1949 |
| 2,606,648 | Smoker | Aug. 12, 1952 |
| 2,608,288 | Talbot | Aug. 26, 1952 |
| 2,675,953 | Van Poolen | Apr. 20, 1954 |
| 2,683,560 | Keller | July 13, 1954 |
| 2,738,912 | Kieffaber | Mar. 20, 1956 |
| 2,758,731 | Davis | Aug. 14, 1956 |
| 2,759,593 | Copping | Aug. 21, 1956 |
| 2,789,704 | Lewin | Apr. 23, 1957 |
| 2,812,079 | Carnine et al. | Nov. 5, 1957 |
| 2,818,987 | Krupp | Jan. 7, 1958 |
| 2,886,195 | Stadelman | May 12, 1959 |
| 2,927,707 | Reed | Mar. 8, 1960 |
| 2,975,920 | Reed et al. | Mar. 21, 1961 |

FOREIGN PATENTS

| | | |
|---|---|---|
| 908,962 | Germany | Apr. 12, 1954 |